US011633821B2

(12) United States Patent
Izumi et al.

(10) Patent No.: US 11,633,821 B2
(45) Date of Patent: Apr. 25, 2023

(54) CUTTING APPARATUS

(71) Applicant: DISCO CORPORATION, Tokyo (JP)

(72) Inventors: Kuniharu Izumi, Tokyo (JP); Zhibo Su, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 17/649,710

(22) Filed: Feb. 2, 2022

(65) Prior Publication Data
US 2022/0258294 A1 Aug. 18, 2022

(30) Foreign Application Priority Data
Feb. 17, 2021 (JP) .............................. JP2021-023388

(51) Int. Cl.
| B23Q 3/157 | (2006.01) |
| B26D 7/26 | (2006.01) |
| B23Q 3/155 | (2006.01) |
| B28D 5/02 | (2006.01) |
| B24B 45/00 | (2006.01) |
| B24B 49/08 | (2006.01) |

(52) U.S. Cl.
CPC ........... B23Q 3/1552 (2013.01); *Y10T 483/13* (2015.01); *Y10T 483/174* (2015.01)

(58) Field of Classification Search
CPC ....... B26D 7/2621; B28D 5/022–5/029; B24B 27/06; Y10S 451/911; Y10T 83/9372–83/9379; Y10T 483/174; B27B 5/32–5/325; B23Q 17/005; B23Q 17/007; B23Q 3/155–3/15793
USPC .................. 451/911; 83/663–666; 483/33
See application file for complete search history.

(56) References Cited

U.S. PATENT DOCUMENTS

| 5,778,751 A | * | 7/1998 | Tsuchishima | ........ B26D 7/2621 |
| | | | | 83/676 |
| 6,030,326 A | * | 2/2000 | Azuma | .............. B23Q 3/15722 |
| | | | | 483/30 |
| 2015/0020666 A1 | * | 1/2015 | Wakita | .................. B23B 31/307 |
| | | | | 83/401 |
| 2019/0176290 A1 | * | 6/2019 | Nitta | ...................... B24B 41/068 |
| 2021/0316468 A1 | * | 10/2021 | Terada | .................. B26D 7/2621 |
| 2022/0203487 A1 | * | 6/2022 | Terada | .................. B23Q 3/1556 |

FOREIGN PATENT DOCUMENTS

| JP | 2005-059151 A | * | 3/2005 |
| JP | 2013132701 A | | 7/2013 |

* cited by examiner

*Primary Examiner* — Erica E Cadugan
(74) *Attorney, Agent, or Firm* — Greer Burns & Crain Ltd.

(57) ABSTRACT

A cutting apparatus includes a cutting unit that has a spindle with an annular cutting blade mounted to a tip part of the spindle through a blade mount, and a determining unit. The determining unit has a second flow path that is connected to a first flow path in a mounter of the blade mount for causing a negative or positive pressure to act on the first flow path, a measuring device that obtains a measured value of at least one of a pressure and a flow rate in the second flow path, and a screw-engaged state determining section that determines that a screw-engaged state of a fixed nut with a boss section of the mounter where the cutting blade is disposed is defective in a case where the measured value when the negative or positive pressure acts on the first flow path indicates an abnormal value.

2 Claims, 7 Drawing Sheets

CUTTING APPARATUS

BACKGROUND OF THE INVENTION

Field of the Invention

The present invention relates to a cutting apparatus including a spindle to which a cutting blade for cutting a workpiece is mounted.

Description of the Related Art

For dividing a semiconductor wafer formed with a plurality of semiconductor devices on a front surface side thereof into individual device chips, a cutting apparatus is widely used. The cutting apparatus has a cutting unit for cutting the semiconductor wafer. The cutting unit includes a spindle to which a cutting blade is mounted. Because a cutting edge of the cutting blade is worn attendant on the use thereof, it should be replaced, as required, according to the extent of the wear. As the cutting blade, for example, a hub-type cutting blade in which an annular cutting edge is adhered to one surface of an annular base made of a metal is used (see, for example, Japanese Patent Laid-open No. 2013-132701).

To mount this cutting blade to the spindle, a boss section of a mounter fixed to a tip part of the spindle is inserted into a penetrating hole of the cutting blade, and a female screw formed at an inner circumferential side surface of an annular fixed nut is screwed to a male screw formed on a peripheral side surface of a tip part of the boss section (namely, the fixed nut is screw-engaged with the boss section). However, in a case where the fixed nut is screwed such that the rotational axis of the fixed nut is obliquely inclined relative to the center axis of the boss section, the cutting blade is not sufficiently fixed by the mounter and the fixed nut. When a workpiece is cut in this state, oblique cutting in which the cut groove is inclined relative to the thickness direction of the workpiece may be generated, or damage to the cutting edge of the cutting blade may be generated.

SUMMARY OF THE INVENTION

The present invention has been made in consideration of the above problems. It is an object of the present invention to detect a defective screw-engaged state of a fixed nut.

In accordance with an aspect of the present invention, there is provided a cutting apparatus including a cutting unit that has a spindle with an annular cutting blade mounted to a tip part of the spindle through a blade mount, and a determining unit that determines a state of the cutting blade on the blade mount. The blade mount includes a mounter fixed to the tip part of the spindle, and a fixed nut that presses the cutting blade against the mounter to clamp the cutting blade together with the mounter, the mounter has a boss section that is inserted into a central hole of the cutting blade and has a male screw for screw engagement with the fixed nut, an annular flange section that is located on a base end side of the boss section, protrudes outside relative to the boss section in a radial direction of the boss section, and can make contact with the cutting blade in a state in which the cutting blade is inserted into the boss section, and a first flow path that is formed in the mounter and is connected to an opening located outside the boss section and inside the flange section, and the determining unit has a second flow path that is connected to the first flow path in the mounter for causing a negative pressure or a positive pressure to act on the first flow path, a measuring device that obtains a measured value of at least one of a pressure in the second flow path and a flow rate of a fluid flowing through the second flow path, a screw-engaged state determining section that determines that a screw-engaged state of the fixed nut with the boss section is defective in a case where the measured value when the negative pressure or the positive pressure acts on the first flow path in a state in which the fixed nut is at least partly screw-engaged with the boss section of the mounter where the cutting blade is disposed indicates an abnormal value, and an informing section that informs a determination result of the screw-engaged state determining section.

Preferably, the cutting apparatus further includes a blade replacement unit. The blade replacement unit has a blade holding section that detachably holds the cutting blade, a fixed nut holding section that rotatably holds the fixed nut, and a moving section that moves the blade holding section and the fixed nut holding section.

The cutting apparatus according to one mode of the present invention includes the determining unit that determines a state of the cutting blade on the blade mount. The determining unit has the second flow path that is connected to the first flow path of the mounter constituting the blade mount for causing a negative pressure or a positive pressure to act on the first flow path, and the measuring device that obtains the measured value of at least one of the pressure in the second flow path and the flow rate of the fluid flowing through the second flow path. The determining unit further has the screw-engaged state determining section. In a case where the measured value when the negative pressure or the positive pressure is made to act on the first flow path in a state in which the fixed nut is at least partly screw-engaged with the boss section of the mounter where the cutting blade is disposed indicates an abnormal value, the screw-engaged state determining section determines that the screw-engaged state of the fixed nut with the boss section is defective. The determining unit further has the informing section that informs a determination result of the screw-engaged state determining section. Since it can be informed that the screw-engaged state is defective by the informing section, starting of the cutting of the workpiece in a state in which the cutting blade is not properly mounted can be prevented.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
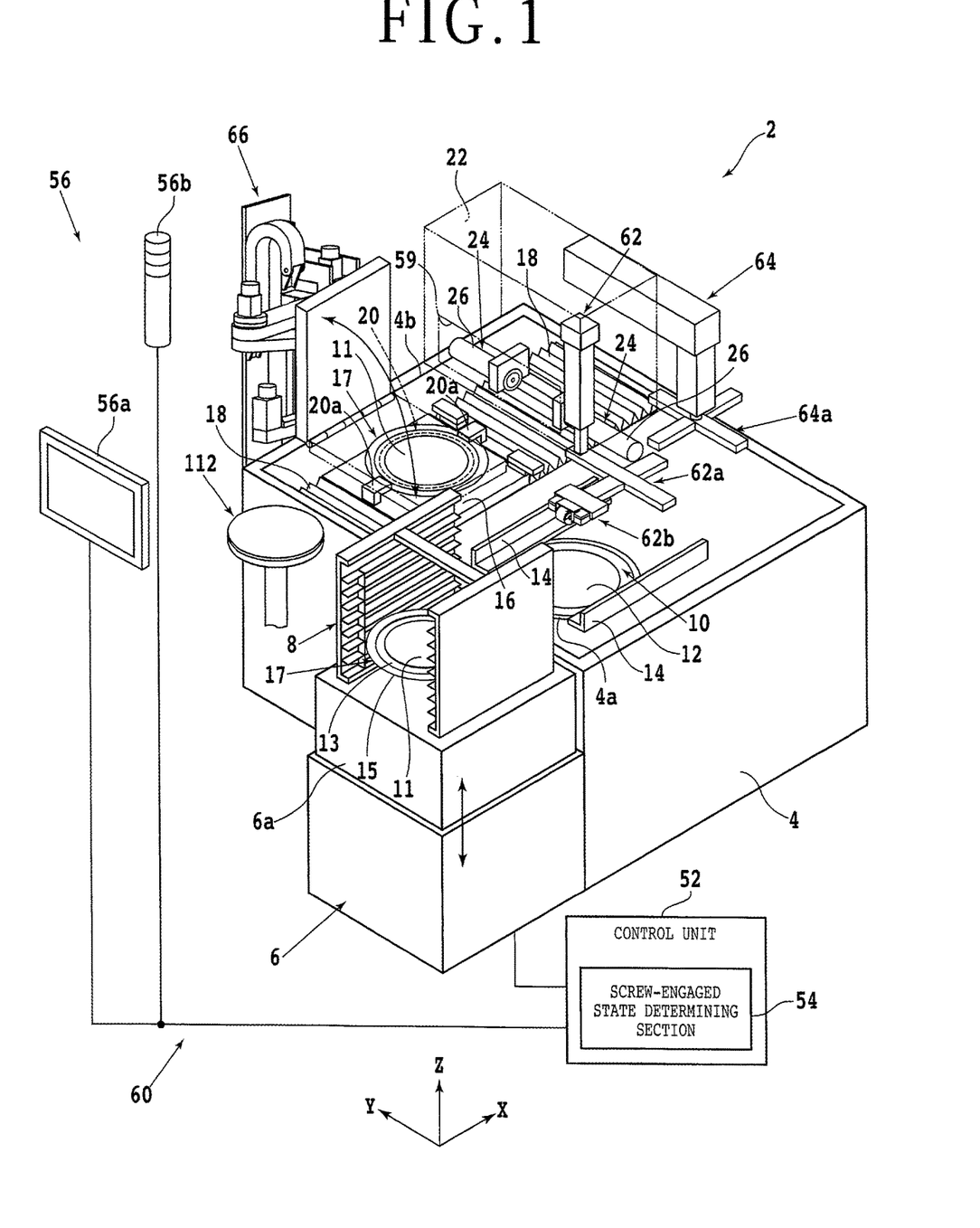
FIG. 1 is a perspective view of a cutting apparatus.

An embodiment according to one mode of the present invention will be described referring to the attached drawings. FIG. 1 is a perspective view of a cutting apparatus 2. An X-axis direction (processing feeding direction), a Y-axis direction (indexing feeding direction), and a Z-axis direction (vertical direction) depicted in FIG. 1 are mutually orthogonal directions. Note that, in FIG. 1, a part of constituent elements is depicted in functional blocks. The cutting apparatus 2 includes a base 4 that supports each of the constituent elements. At a corner part of the base 4, an elevator 6 which is moved upward and downward by a lifting mechanism (not illustrated) is provided.

A cassette 8 for accommodating a workpiece 11 (workpiece unit 17) is mounted on an upper surface of a lifting base 6a of the elevator 6. The workpiece 11 is, for example, a disk-shaped wafer of a semiconductor material such as silicon. A dicing tape 13 larger in diameter than the workpiece 11 is attached to a back surface side of the workpiece 11, and an annular frame 15 made of a metal is attached to a peripheral part of the dicing tape 13. As a result, the workpiece unit 17 with the workpiece 11 supported by the frame 15 through the dicing tape 13 is formed.

A circular opening 4a is formed on one side in the X-axis direction of the elevator 6. A cleaning unit 10 for cleaning the workpiece 11 after cutting is disposed in the opening 4a. The cleaning unit 10 has a spinner table 12, a nozzle (not illustrated) and the like. A pair of guide rails 14 are provided on an upper side of the cleaning unit 10. The pair of guide rails 14 adjust the position of the workpiece unit 17 in the Y-axis direction, by moving so as to approach each other along the Y-axis direction. A rectangular opening 4b having a longitudinal part along the X-axis direction is formed on one side in the Y-axis direction of the pair of guide rails 14. A rectangular table cover 16 covering a part of the opening 4b is provided in the opening 4b.

Bellows-like covers 18 contractible and expandable in the X-axis direction are provided on both sides in the X-axis direction of the table cover 16. A disk-shaped chuck table 20 for suction-holding the workpiece unit 17 and the like is provided on an upper side of the table cover 16. An upper surface of the chuck table 20 functions as a holding surface for suction-holding the workpiece unit 17 by utilizing a negative pressure. A pair of clamp units 20a for clamping the frame 15 are provided at side parts of the chuck table 20.

A rotational drive source (not illustrated) such as a motor for rotating the chuck table 20 around a rotational axis substantially parallel to the Z-axis direction is disposed on a lower side of the table cover 16. Further, on a lower side of the rotational drive source, a ball screw type X-axis moving mechanism (processing feeding unit) (not illustrated) is provided. Of the opening 4b, a region adjacent to the opening 4a in the Y-axis direction is a conveying-in/conveying-out region where conveying in and conveying out of the workpiece 11 are conducted. In addition, of the opening 4b, on the opposite side in the X-axis direction from the conveying-in/conveying-out region, a cutting region where cutting of the workpiece 11 is conducted is provided. On an upper side of the cutting region, a rectangular parallelepiped cover member 22 formed of a metal or the like is provided. In the inside of a space covered by the cover member 22, a pair of cutting units 24 are disposed. Here, the configuration of the cutting unit 24 will be described using FIGS. 2 and 3.

Figure 2:
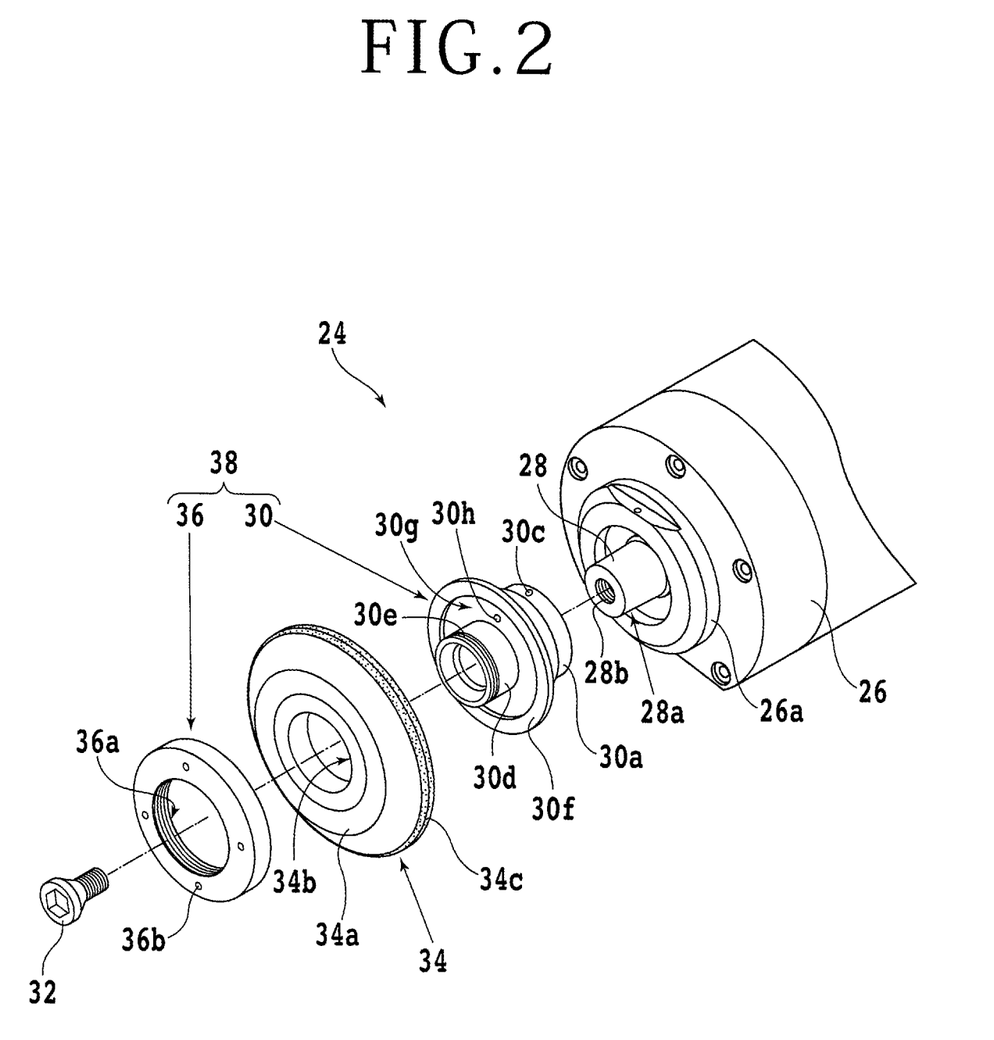
FIG. 2 is an exploded perspective view of a cutting unit.

FIG. 2 is an exploded perspective view of the cutting unit 24. As depicted in FIG. 2, the cutting unit 24 has a tubular spindle housing 26. A cylindrical spindle 28 is rotatably accommodated inside the spindle housing 26. A rotational drive source (not illustrated) such as a servo motor is provided at a base end part of the spindle 28. A tip part 28a of the spindle 28 projects from the spindle housing 26, and the tip part 28a is formed with a tapped hole 28b.

A substantially disk-shaped mounter 30 is disposed at the tip part 28a. A cylindrical first boss section 30a is formed on one surface side of a central part of the mounter 30. A first flow path 30b (see FIG. 3) is formed inside the first boss section 30a (inside the mounter 30), and an opening 30c located on one end of the first flow path 30b is formed in a peripheral side surface of the first boss section 30a. On the opposite side of the mounter 30 from the first boss section 30a, a cylindrical second boss section (boss section) 30d is formed. A peripheral side surface of a tip part of the second boss section 30d is formed with a male screw 30e for screw engagement with a fixed nut 36 described later. On a base end side of the second boss section 30d, an annular flange section 30f projecting to the outer side than the second boss section 30d in the radial direction of the second boss section 30d is formed. In addition, an annular recess 30g is formed outside the second boss section 30d and inside the flange section 30f. The recess 30g is formed with an opening 30h located at the other end of the first flow path 30b.

To fix the mounter 30 to the spindle 28, first, the tip part 28a is fitted into a cylindrical recess formed inside the first boss section 30a. Next, the male screw 32 is fastened to the tapped hole 28b, whereby the mounter 30 is fixed to the tip part 28a (see FIG. 3). An annular cutting blade 34 is mounted to the mounter 30 fixed to the tip part 28a. The cutting blade 34 in this example is what is called a hub-type blade, but a hubless-type (namely, washer-type) blade may be mounted. The cutting blade 34 has an annular base 34a formed from an aluminum alloy or the like. The base 34a is formed with a central hole 34b penetrating from one surface $34a_1$ to the other surface $34a_2$. In addition, an annular cutting edge 34c is fixed by an adhesive to a peripheral part of the one surface $34a_1$.

To mount the cutting blade 34 to the mounter 30, the second boss section 30d is inserted into the central hole 34b of the annular cutting blade 34 such that the one surface $34a_1$ faces the flange section 30f, and, further, the annular fixed nut 36 is screw-engaged with the second boss section 30d. The fixed nut 36 has a tapped hole 36a formed with a female screw. A plurality of pin inserted sections 36b utilized when gripping and rotating the fixed nut 36 are formed in the periphery of the tapped hole 36a. In this example, four pin inserted sections 36b are disposed at substantially regular intervals around the tapped hole 36a. An annular flange section 36c (see FIG. 3) is formed on one surface side of the fixed nut 36. When the fixed nut 36 is properly fastened to the male screw 30e, the flange section 36c of the fixed nut 36 makes contact with the other surface $34a_2$, and the flange section 30f of the mounter 30 makes contact with the one surface $34a_1$.

Figure 3:
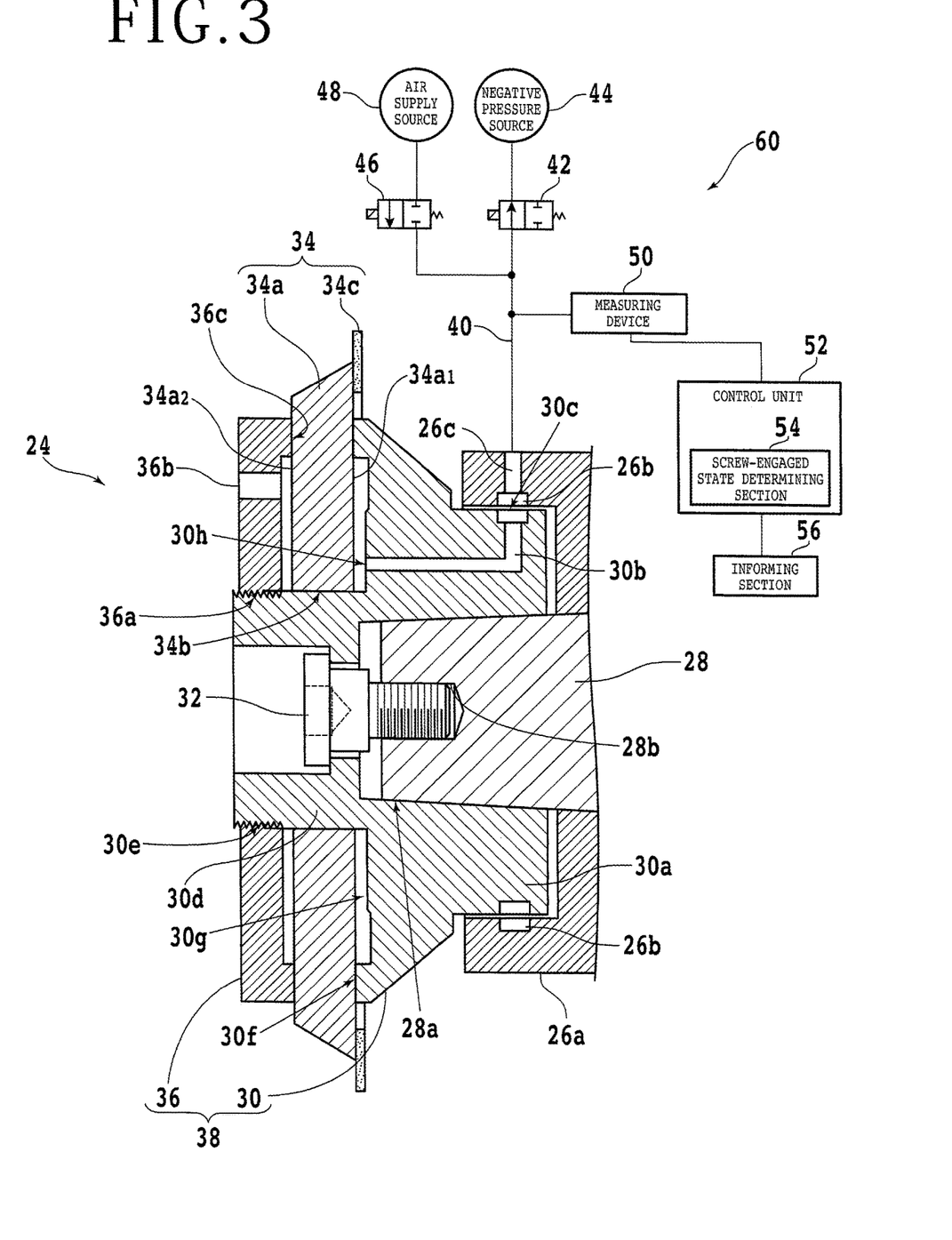
FIG. 3 is a partly sectional side view of the cutting unit with a fixing nut properly fastened.

In this way, the cutting blade 34 is pressed against the mounter 30 by the fixed nut 36, and is clamped between the fixed nut 36 and the mounter 30. FIG. 3 is a partly sectional side view of the cutting unit 24 to which the fixed nut 36 is properly fastened. Note that, in the present embodiment, the mounter 30 and the fixed nut 36 are collectively referred to as a blade mount 38. In other words, the cutting blade 34 is mounted to the tip part 28a of the spindle 28 through the blade mount 38.

At the tip part of the spindle housing 26, a cylindrical boss section 26a is provided so as to be able to surround the periphery of the first boss section 30a. An inner circumferential part of the boss section 26a is formed with an annular groove 26b over the one circumference. The boss section 26a is formed with a suction passage 26c connected to the annular groove 26b. One end of the suction passage 26c is connected to the first flow path 30b of the mounter 30 through a gap. The other end of the suction passage 26c is exposed to a peripheral side surface of the boss section 26a, and is connected to one end of the second flow path 40 that causes a negative pressure or a positive pressure to act on the first flow path 30b.

The second flow path 40 in this example is branched into two parts, and a negative pressure source 44 such as an ejector is connected to one side branched through a first solenoid valve 42. In addition, an air supply source 48 having an air compressor, an air tank, and the like is connected to the other side branched through a second solenoid valve 46. A measuring device 50 is connected to the second flow path 40 between (i) the first solenoid valve 42 and the second solenoid valve 46 and (ii) the one end of the second flow path 40. The measuring device 50 includes one of or both a pressure gauge and a flowmeter, and obtains a measured value of at least one of the pressure inside the second flow path 40 and the flow rate of air (fluid) flowing through the second flow path 40.

As a pressure gauge, for example, a diaphragm pressure gauge can be used, and, as the flowmeter, for example, an ultrasonic type flowmeter or a solenoid type flowmeter can be used. The measuring device 50 is utilized when inspecting whether or not the fixed nut 36 is properly screw-engaged with the second boss section 30d. For example, in a case of inspecting the screw-engaged state of the fixed nut 36 by utilizing a negative pressure, the first solenoid valve 42 is put into an open state, whereas the second solenoid valve 46 is put into a closed state, and a negative pressure is made to act on the first flow path 30b for a predetermined time (for example, 10 seconds). In this instance, the measuring device 50 measures the pressure in or the flow rate through the second flow path 40. In addition, in a case of inspecting the screw-engaged state of the fixed nut 36 by utilizing a positive pressure, the first solenoid valve 42 is put into a closed state, whereas the second solenoid valve 46 is put into an open state, and a positive pressure is made to act on the first flow path 30b for a predetermined time (for example, 10 seconds).

In this instance, the measuring device 50 measures the pressure in or the flow rate through the second flow path 40. The measuring device 50 is connected to a control unit 52 (see FIG. 1). The control unit 52 includes, for example, a computer including a processing device such as a processor represented by a central processing unit (CPU), a main storage device such as a dynamic random access memory (DRAM), and an auxiliary storage device such as a flash memory.

Software is stored in the auxiliary storage device, and by operating the processing device and the like according to the software, the functions of the control unit 52 are realized. A program for comparing the measured value obtained by the measuring device 50 with a predetermined threshold is stored in the auxiliary storage device. The program, by being executed by the computer, functions as a screw-engaged state determining section 54. Note that the screw-engaged state determining section 54 may include an application specific integrated circuit (ASIC) or a field-programmable gate array (FPGA) or the like. The screw-engaged state determining section 54 compares at least one of the pressure value in the second flow path 40 (the measured value obtained by the measuring device 50) and the flow rate value through the second flow path 40 (the measured value obtained by the measuring device 50) with the predetermined threshold.

Figure 4:
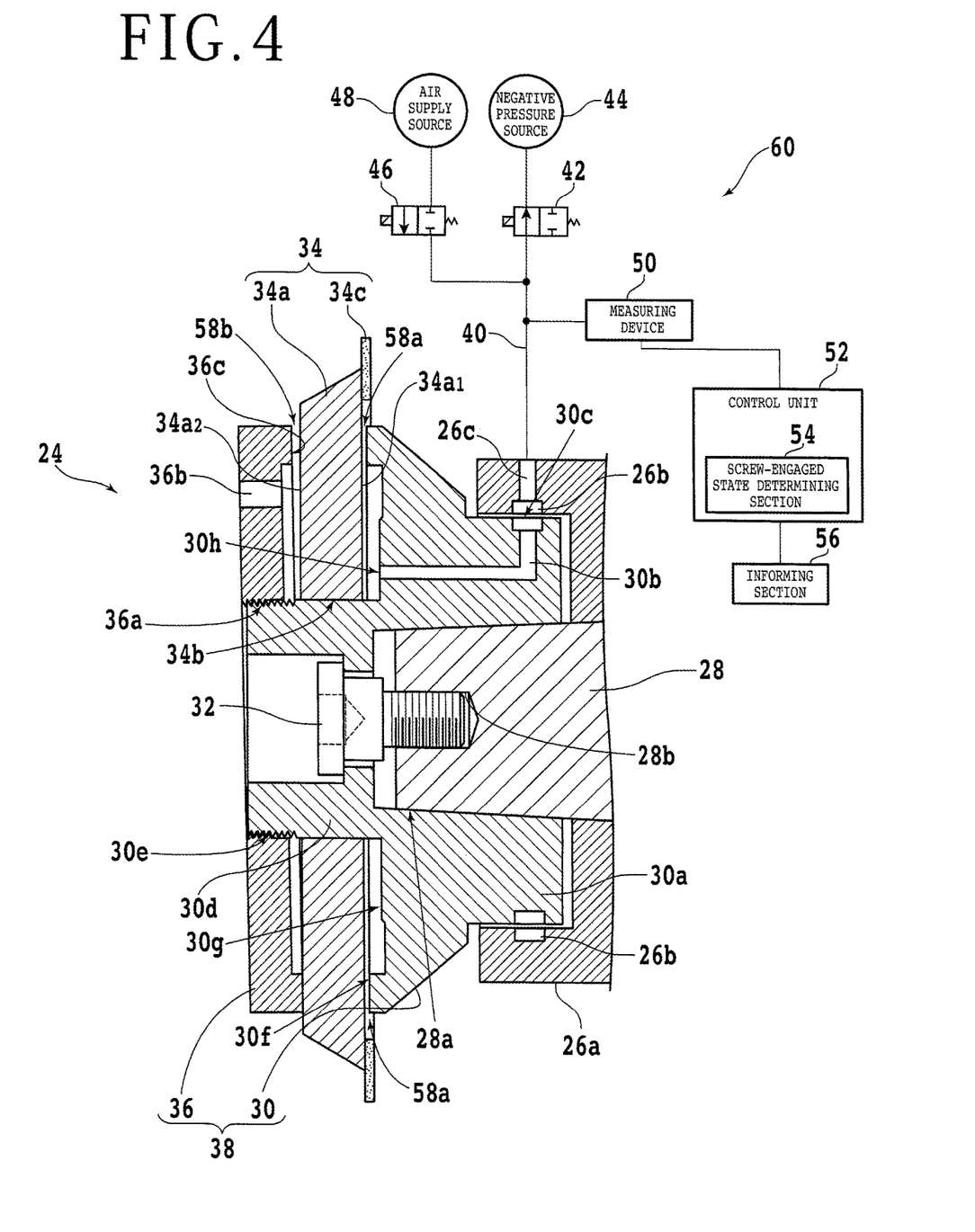
FIG. 4 is a partly sectional side view of the cutting unit with the fixing nut not properly fastened.

Here, a case where a negative pressure is made to act on the first flow path 30b in a state in which the fixed nut 36 is at least partly screw-engaged with the second boss section 30d at which the cutting blade 34 is disposed is considered referring to FIGS. 3 and 4. A closed space is configured by the cutting blade 34 and the flange section 30f when the fixed nut 36 is properly fastened as depicted in FIG. 3, and, therefore, when a negative pressure is made to act on the first flow path 30b, the pressure inside the second flow path 40 becomes a low pressure value $A_1$ which is comparatively low. In addition, the flow rate through the second flow path 40 becomes a low flow rate value $B_1$ which is comparatively low.

FIG. 4 is a partly sectional side view of the cutting unit 24 to which the fixed nut 36 is not properly fastened. In FIG. 4, the fixed nut 36 is screwed to the mounter 30 in a state in which the rotational axis of the fixed nut 36 is obliquely inclined relative to the center axis of the second boss section 30d. Therefore, the fixed nut 36 does not go to the base end side of the second boss section 30d as depicted in FIG. 3, and is stopped on the tip part side of the second boss section 30d as compared to the case of FIG. 3. In this case, the cutting blade 34 is not sufficiently fixed by the mounter 30 and the fixed nut 36. In addition, a space defined by the cutting blade 34 and the flange section 30f is not a closed space, and a gap 58a may be formed between the cutting blade 34 and the flange section 30f. Further, a gap 58b may also be formed between the other surface $34a_2$ and the flange section 36c.

When a negative pressure is made to act on the first flow path 30b in a state in which the gap 58a is formed as depicted in FIG. 4, air flows in from the gap 58a, so that the pressure inside the second flow path 40 becomes a high pressure value $A_3$ which is comparatively high, and the flow rate through the second flow path 40 becomes a high flow rate value $B_3$ which is comparatively high. In view of this, in the case of causing a negative pressure to act on the first flow path 30b, a predetermined value between the low pressure value $A_1$ and the high pressure value $A_3$ is set in the screw-engaged state determining section 54 as a threshold $A_2$ of pressure. In addition, a predetermined value between the low flow rate value $B_1$ and the high flow rate value $B_3$ is set in the screw-engaged state determining section 54 as a threshold $B_2$ of flow rate.

The relationship of pressure and flow rate when the negative pressure is made to act on the first flow path 30b is set forth in Table 1. In a case where the pressure value is an abnormal value larger than the threshold $A_2$, the screw-engaged state determining section 54 determines that the screw-engaged state of the fixed nut 36 with the second boss section 30d is defective, and, in a case where the flow rate value is an abnormal value larger than the threshold $B_2$, determines that the screw-engaged state is defective.

TABLE 1

| | The case where a negative pressure is made to act on the first flow path 30b | | |
|---|---|---|---|
| Screw-engaged state | favorable | | defective |
| Pressure value | low pressure value $A_1$ | ($A_1$<) threshold $A_2$ (<$A_3$) | high pressure value $A_3$ |
| Flow rate value | low flow rate value $B_1$ | ($B_1$<) threshold $B_2$ (<$B_3$) | high flow rate value $B_3$ |

Next, a case where a positive pressure instead of a negative pressure is made to act on the first flow path 30b will be described. When the fixed nut 36 is properly fastened (see FIG. 3), a closed space is configured by the cutting blade 34 and the flange section 30f. In this case, when a positive pressure is made to act on the first flow path 30b, air does not flow out through the gap 58a, so that the pressure inside the second flow path 40 becomes a high pressure value $A_6$ which is comparatively high. On the other hand, a flow of air flowing out through the gap 58a is not formed, so that the flow rate through the second flow path 40 becomes a low flow rate value $B_4$ which is comparatively low.

On the other hand, in a case where the fixed nut 36 is not properly fastened (see FIG. 4), when a positive pressure is made to act on the first flow path 30b, the gap 58a is formed, so that the pressure in the second flow path 40 becomes a low pressure value $A_4$ which is comparatively low, but the flow rate through the second flow path 40 becomes a high flow rate value $B_6$ which is comparatively high. In view of this, in a case of causing the positive pressure to act on the first flow path 30b, a predetermined value between the low pressure value $A_4$ and the high pressure value $A_6$ is set in the screw-engaged state determining section 54 as a threshold $A_5$ of pressure. In addition, a predetermined value between the low flow rate value $B_4$ and the high flow rate value $B_6$ is set in the screw-engaged state determining section 54 as a threshold $B_5$ of flow rate.

The relationship of pressure and flow rate when causing a positive pressure to act on the first flow path 30b is set forth in Table 2. In a case where the pressure value is an abnormal value smaller than the threshold $A_5$, the screw-engaged state determining section 54 determines that the screw-engaged state of the fixed nut 36 with the second boss section 30d is defective, and, in a case where the flow rate value is an abnormal value larger than the threshold $B_5$, determines that the screw-engaged state is defective.

TABLE 2

| | The case where a positive pressure is made to act on the first flow path 30b | | |
|---|---|---|---|
| Screw-engaged state | favorable | | defective |
| Pressure value | high pressure value $A_6$ | ($A_6$>) threshold $A_5$ (>$A_4$) | low pressure value $A_4$ |
| Flow rate value | low flow rate value $B_4$ | ($B_4$<) threshold $B_5$ (<$B_6$) | high flow rate value $B_6$ |

A determination result of the screw-engaged state determining section 54 is informed to the operator (not illustrated) by an informing section 56. The informing section 56 has at least one of a monitor 56a, a lamp 56b, and a speaker (not illustrated). For example, whether the screw-engaged state is favorable or defective is displayed on the monitor 56a. In addition, for example, in a case where the screw-engaged state is favorable, the lamp 56b is turned on in a first color (for example, blue), and in a case where the screw-engaged state is defective, the lamp 56b is turned on in a second color (for example, red) different from the first color. Further, for example, in a case where the screw-engaged state is favorable, a sound of "The screw-engaged state is favorable." or "Normal." is emitted from the speaker, and, in a case where the screw-engaged state is defective, a sound of "The screw-engaged state is defective." or "Abnormal." is emitted from the speaker.

Note that the informing section 56 constitutes a determining unit 60 that determines a state of the cutting blade 34 on the blade mount 38, together with the second flow path 40, the measuring device 50, and the screw-engaged state determining section 54. In a case where it is informed that the screw-engaged state of the fixed nut 36 is defective, for example, the operator stops operation of the cutting apparatus 2, inspects the screw-engaged state of the fixed nut 36, or adjusts the mounting of the fixed nut 36. Therefore, cutting of the workpiece 11 in a state where the cutting blade 34 is not properly mounted can be prevented.

Here, returning to FIG. 1, other constituent elements of the cutting apparatus 2 will be described. A door section 59 is provided at a side surface of the cover member 22 on the conveying-in/conveying-out region side. The door section 59 opens and closes a part of the cover member 22, by moving in an up-down direction or a left-right direction. A first conveying unit 62 is provided on an upper side of the base 4. The first conveying unit 62 has an air cylinder which is connected to a horizontal direction moving mechanism (not illustrated) and the longitudinal part of which is disposed along the Z-axis direction. A suction unit 62a is provided at a lower end part of a rod of the air cylinder.

A grasping mechanism 62b capable of grasping a part of a peripheral part of the frame 15 is provided at an end part of the suction unit 62a on the elevator 6 side. An arm section of a second conveying unit 64 is provided on an upper side of the first conveying unit 62. A horizontal direction moving mechanism (not illustrated) is connected to one end part of the arm section, and an air cylinder of which a longitudinal part is disposed along the Z-axis direction is connected to the other end part of the arm section. A suction unit 64a is provided at a lower end part of a rod of the air cylinder.

Here, the procedure of cutting the workpiece 11 by use of the cutting apparatus 2 will be described briefly. First, the first conveying unit 62 grasps the frame 15 by the grasping mechanism 62b, and draws out the workpiece unit 17 from the cassette 8 onto the pair of guide rails 14. After the pair of guide rails 14 adjust the position of the workpiece unit 17 in the Y-axis direction, the first conveying unit 62 sucks the frame 15 by the suction unit 62a, and conveys the workpiece unit 17 to the chuck table 20 disposed in the conveying-in/conveying-out region.

Thereafter, the chuck table 20 is moved into the cutting region in the state of suction-holding the back surface side of the workpiece 11 by the holding surface. After the orientation of streets (not illustrated) of the workpiece 11 in the X-Y plane is adjusted by alignment, the cutting unit 24 cuts the workpiece 11. After the cutting, the chuck table 20 is moved into the conveying-in/conveying-out region. The second conveying unit 64 sucks the frame 15 by the suction unit 64a, and conveys the workpiece unit 17 from the chuck table 20 to the cleaning unit 10.

After cleaning and drying of the workpiece 11 at the cleaning unit 10, the first conveying unit 62 conveys the workpiece unit 17 to the cassette 8 by utilizing the pair of guide rails 14. In this way, the workpieces 11 are sequentially cut. Incidentally, as the cutting proceeds, the cutting blade 34 is worn, so that it is necessary to replace the worn cutting blade 34. The cutting apparatus 2 in the present embodiment has a blade replacement unit 66 for automatically replacing the hub-type cutting blade 34.

Figure 5:
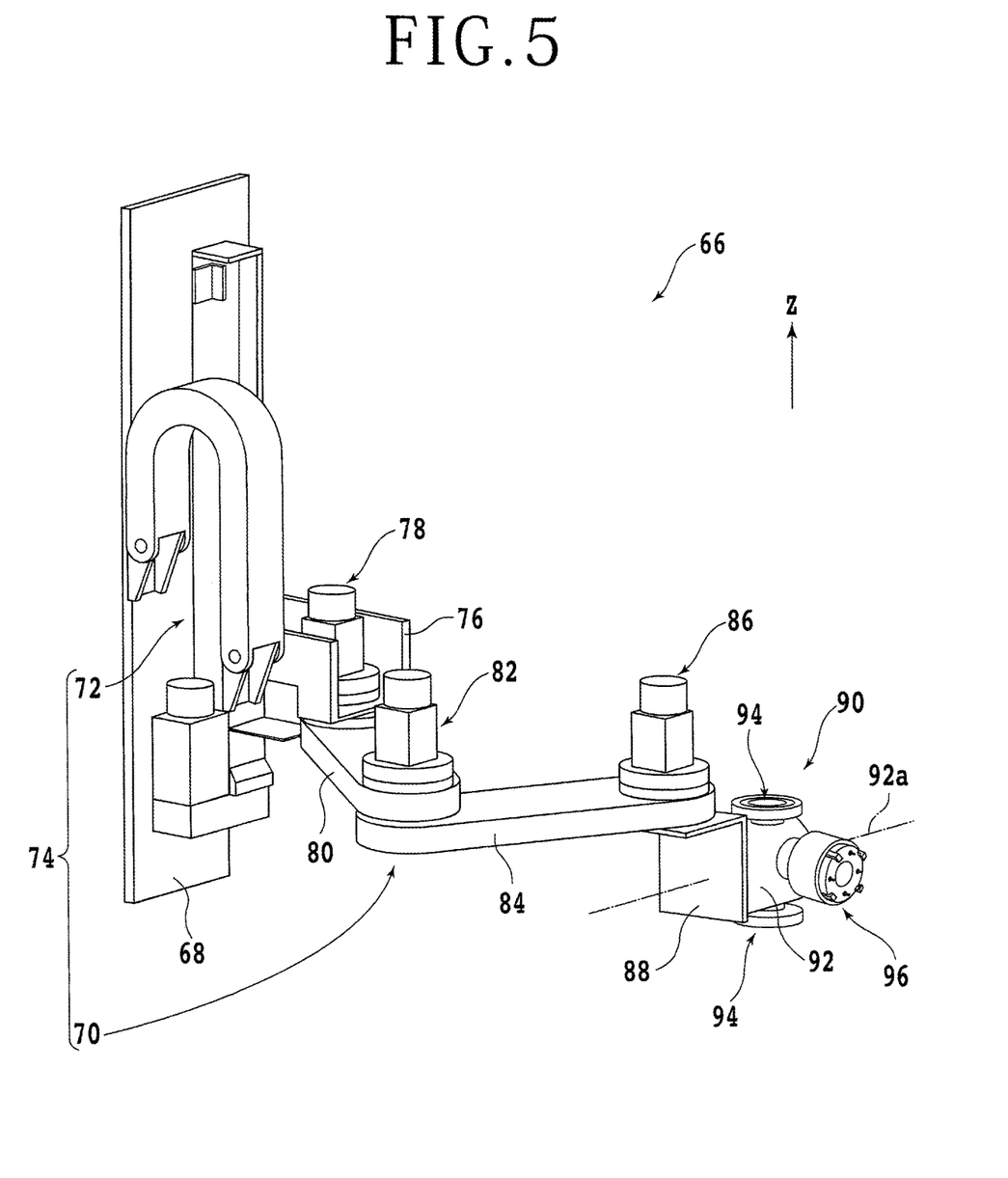
FIG. 5 is a perspective view of a blade replacement unit.
Figure 6:
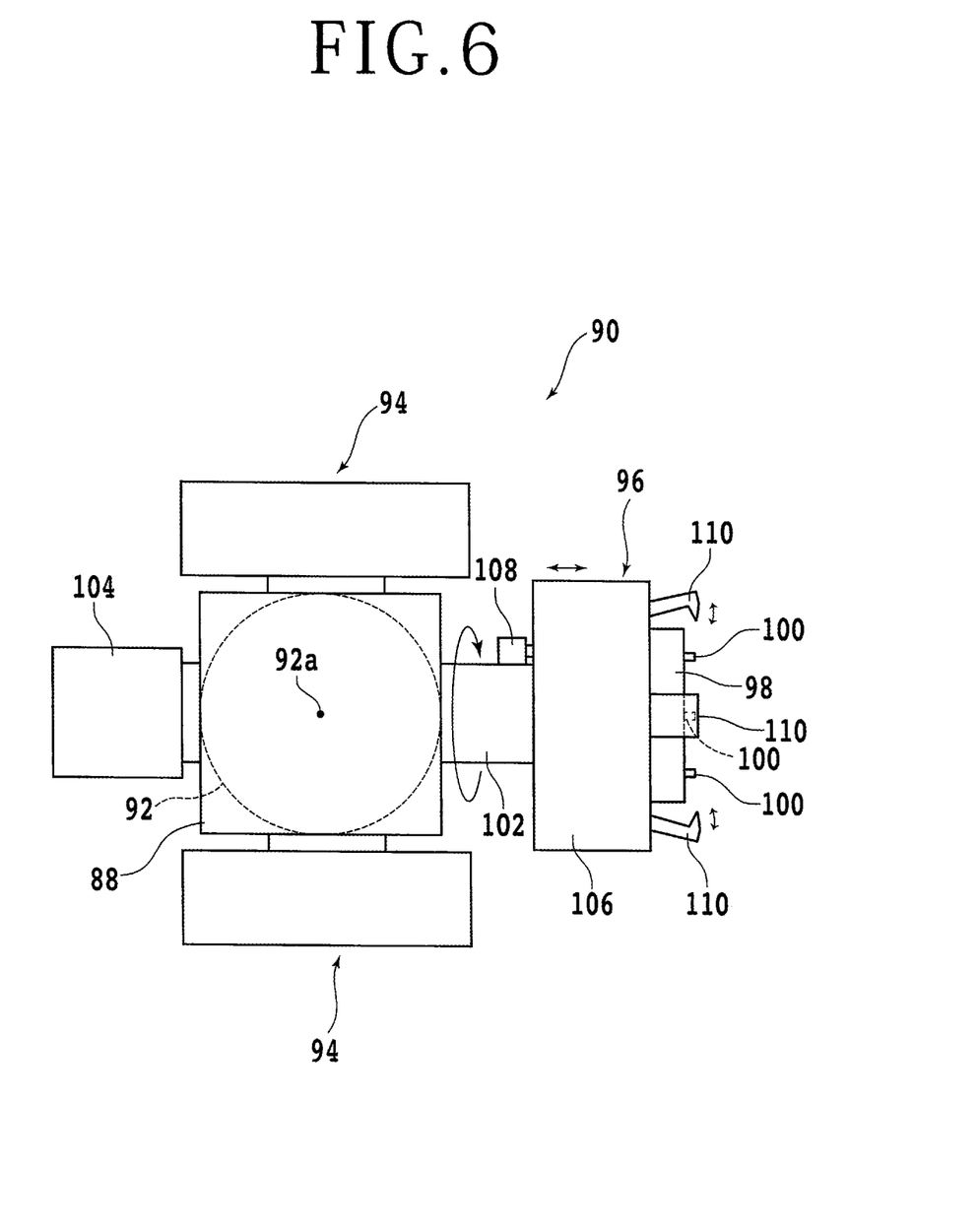
FIG. 6 is a side view of a replacement mechanism.

The blade replacement unit 66 will be described using FIGS. 5 and 6. FIG. 5 is a perspective view of the blade replacement unit 66, and FIG. 6 is a side view of a replacement mechanism 90. The blade replacement unit 66 has a base plate 68 fixed to the base 4. The base plate 68 is provided with a lifting mechanism 72 for moving an articulated robot 70 along the Z-axis direction. Note that the articulated robot 70 and the lifting mechanism 72 constitute a moving section 74 for moving the replacement mechanism 90 (a blade holding jig 94, a fixed nut holding section 96, and the like).

The lifting mechanism 72 has a motor (not illustrated) provided at a lower part of the base plate 68, and a driving pulley (not illustrated) connected to a rotary shaft of the motor. In addition, a driven pulley (not illustrated) is provided at an upper part of the base plate 68. One toothed endless belt (not illustrated) is engaged with the driving pulley and the driven pulley, and a first support member 76 made of a metal is fixed to a part of the toothed endless belt. The first support member 76 is moved along the Z-axis direction attendant on movement of the toothed endless belt. Note that the lifting mechanism 72 is not limited to the configuration of the toothed endless belt and the like. The lifting mechanism 72 may be of a ball screw type. A first rotation mechanism 78 having a rotational drive source such as a motor is attached to the first support member 76.

One end part of a first arm 80 is connected to the first rotation mechanism 78. The first rotation mechanism 78 rotationally moves the first arm 80 in the X-Y plane. A second rotation mechanism 82 having a rotational drive source such as a motor is connected to the other end part of the first arm 80. One end part of a second arm 84 is connected to the second rotation mechanism 82. The second rotation mechanism 82 rotationally moves the second arm 84 in the X-Y plane. A third rotation mechanism 86 having a rotational drive source such as a motor is connected to the other end part of the second arm 84.

A second support member 88 made of a metal is connected to the third rotation mechanism 86. The third rotation mechanism 86 rotationally moves the second support member 88 in the X-Y plane. The replacement mechanism 90 is fixed to the second support member 88. The replacement mechanism 90 is moved between a retracted position (see, for example, FIG. 1) and a replacement position (see, for example, FIG. 5) where the first arm 80, the second arm 84, and the like are developed. The replacement mechanism 90 has a substantially cylindrical housing 92.

A rotational drive source (not illustrated) such as a motor for rotating the housing 92 is accommodated inside the housing 92. By the rotational drive source, the housing 92 can be rotated around a rotational axis 92a along the longitudinal direction (namely, the height direction) of the cylinder of the housing 92. At a side surface of the housing 92, a pair of blade holding jigs (blade holding sections) 94 are disposed such that the rotational axis 92a is interposed therebetween. The blade holding jig 94 has a bottomed cylindrical frame body made of a metal or the like.

An annular member that is formed from an elastic material such as rubber, resin, or elastomer and is capable of suction-holding the base 34a of the cutting blade 34 is disposed at an opening of the frame body. The annular member is formed with a plurality of openings (not illustrated) along the circumferential direction of the annular member, and one end of a third flow path (not illustrated) is connected to each of the openings. A negative pressure source (not illustrated) such as an ejector is connected to the third flow path through a third solenoid valve (not illustrated). In addition, an air supply source (not illustrated) is connected to the third flow path through a fourth solenoid valve (not illustrated). When the third solenoid valve is put into an open state and the fourth solenoid valve is put into a closed state, the cutting blade 34 can be suction held by the blade holding jig 94. On the other hand, when the third solenoid valve is put into a closed state and the fourth solenoid valve is put into an open state, the cutting blade 34 can be released from the blade holding jig 94 by utilizing air. In this way, the blade holding jig 94 can detachably hold the cutting blade 34.

A fixed nut holding section 96 that rotatably holds the fixed nut 36 is provided between the pair of blade holding jigs 94 in the circumferential direction of a side surface of the housing 92. The fixed nut holding section 96 has a disk-shaped base section 98 (see FIG. 6). Four insertion pins 100 insertable into the pin inserted sections 36b are disposed on one surface side of the base section 98 at substantially regular intervals in the circumferential direction of the base section 98. One end part of a rotary shaft 102 is fixed to the other surface side of the base section 98, and a driving section 104 such as a motor is connected to the other end part of the rotary shaft 102.

A cylindrical cover 106 is provided at a peripheral part of the base section 98. The cover 106 can be advanced and retracted along the longitudinal direction of the rotary shaft 102 by an actuator 108 fixed to the rotary shaft 102. Four claw sections 110 are disposed between the base section 98 and the cover 106 at substantially regular intervals in the circumferential direction of the base section 98. Each claw section 110 has its base end part connected to the rotary shaft 102, in a state of being biased to the outside in a radial direction of the base section 98 by a biasing member (not illustrated) such as a spring. When the cover 106 is moved (retracted) in the direction of approaching the housing 92, a tip part of the claw section 110 is moved to the outside in a radial direction of the base section 98. On the other hand, when the cover 106 is moved (advanced) in the direction of spacing away from the housing 92, the tip part of the claw section 110 is moved to the inside in a radial direction of the base section 98.

Next, an example in which the cutting blade 34 is automatically replaced by use of the blade replacement unit 66 will be described. For example, first, utilizing the moving section 74, the replacement mechanism 90 is disposed on an upper side of a blade stock table 112 (see FIG. 1) disposed in the vicinity of the opening 4b. Then, a new cutting blade 34 is suction held by one blade holding jig 94. Subsequently, the replacement mechanism 90 is advanced into the inside of the cover member 22 through the door section 59 in an open state, and the fixed nut 36 is detached from the second boss section 30d by utilizing the fixed nut holding section 96. Specifically, in a state in which a plurality of insertion pins 100 are inserted respectively into the corresponding pin inserted sections 36b, a peripheral part of the fixed nut 36 is held by the tip part of the claw section 110, and the rotary shaft 102 is rotated in a predetermined direction, whereby the fixed nut 36 can be detached.

Next, the used cutting blade 34 is suction held by the other blade holding jig 94, and, thereafter, one blade holding jig 94 is made to face the mounter 30, and the new cutting blade 34 is disposed at the second boss section 30d. Then, the fixed nut 36 is attached to the second boss section 30d by the fixed nut holding section 96. Specifically, in a state in which each insertion pin 100 is inserted into the corresponding pin inserted section 36b, the peripheral part of the fixed nut 36 is held by the tip part of the claw section 110, and the rotary shaft 102 is rotated in the direction reverse to the predetermined direction, whereby the fixed nut 36 can be attached to the second boss section 30d. In the present embodiment, even in a case of automatically replacing the cutting blade 34 by use of the blade replacement unit 66 in this way, the screw-engaged state of the fixed nut 36 is determined by use of the determining unit 60. Therefore, a defective screw-engaged state of the cutting blade 34 generated due to insufficient adjustment of the replacement mechanism 90 or the like can be detected before cutting.

Figure 7A:
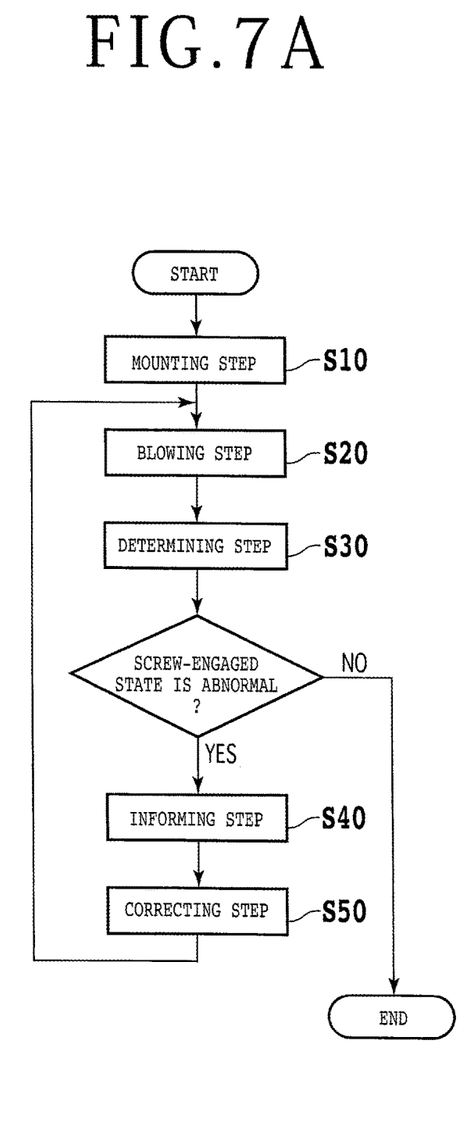
FIG. 7A is a flow chart of a determining method in a case of determining a screw-engaged state of the fixing nut by utilizing a negative pressure.

Next, a method of determining the screw-engaged state of the fixed nut 36 will be described referring to FIGS. 7A and 7B. FIG. 7A is a flow chart of a determining method in a case of determining the screw-engaged state of the fixed nut 36 utilizing a negative pressure. In a mounting step S10, in a state in which the cutting blade 34 is disposed on the second boss section 34d, the fixed nut 36 is screw-engaged with the second boss section 30d with a predetermined torque by the fixed nut holding section 96. Next, the first solenoid valve 42 is put into a closed state, the second solenoid valve 46 is instantaneously (for example, for a predetermined time equal to or less than one second) put into an open state, and a positive pressure is made to act on the first flow path 30b and the second flow path 40.

In this way, blowing is momentarily applied to the base 34a (blowing step S20). In a case where the screw-engaged state is defective as depicted in FIG. 4, the cutting blade 34 is moved to the fixed nut 36 side by the blowing step S20. As a result, in a case where the base 34a is in the state of making contact with the flange section 30f by chance, notwithstanding the screw-engaged state is actually defective as depicted in FIG. 4, mis-determination by the screw-engaged state determining section 54 that the screw-engaged state is favorable, as a result of action of a negative pressure on the first flow path 30b, can be prevented.

After the blowing step S20, the first solenoid valve 42 is put into an open state, whereas the second solenoid valve 46 is put into a closed state, for a predetermined time, and a negative pressure is made to act on the first flow path 30b and the second flow path 40, whereby the screw-engaged state determining section 54 determines the acceptability of the screw-engaged state, i.e. the screw-engaged state is favorable or defective, (determining step S30). In the determining step S30, the screw-engaged state determining section 54 may determine the acceptability based on only the pressure value, or the screw-engaged state determining section 54 may determine the acceptability based on only the flow rate value. In addition, the screw-engaged state determining section 54 may determine the acceptability based on both the pressure value and the flow rate value. In a case where the screw-engaged state is favorable, determination is finished.

On the other hand, when the screw-engaged state is defective, the fact is informed to the operator through the informing section 56 (informing step S40). Upon accepting the information, the operator manually adjusts the mounting of the fixed nut 36, or adjusts the blade replacement unit 66, thereby to again mount the fixed nut 36 (correcting step S50). After the correcting step S50, the process again returns to the blowing step S20. Note that, in a case where the screw-engaged state is defective even after a plurality of times of the correcting step S50, it may be determined that there is physical abnormality in the fixed nut 36, the blade replacement unit 66, or the like, and the determination may be finished.

Figure 7B:
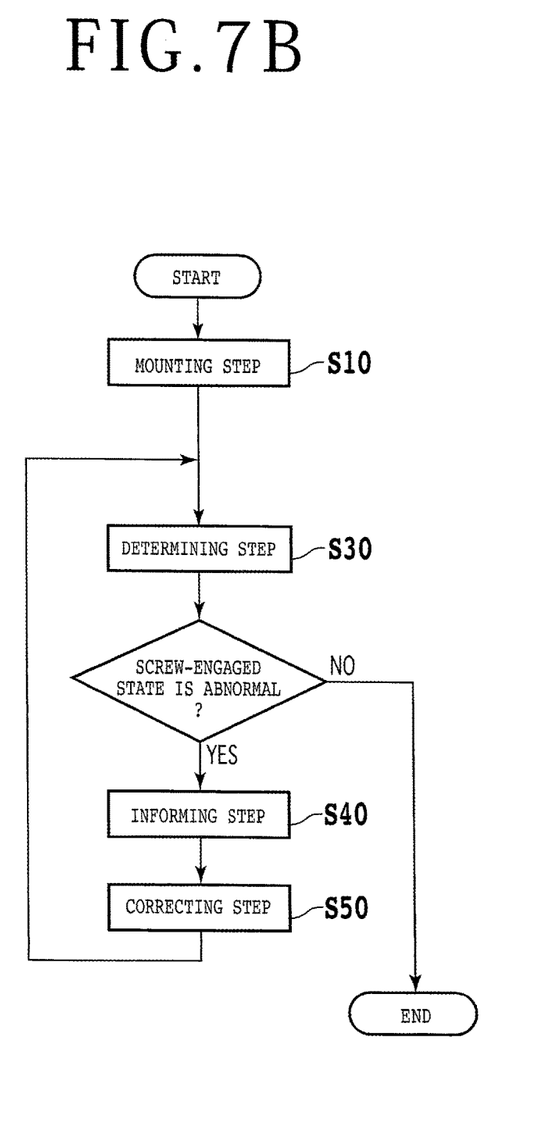
FIG. 7B is a flow chart of the determining method in a case of determining the screw-engaged state of the fixed nut by utilizing a positive pressure.

FIG. 7B is a flow chart of the determining method in a case of determining the screw-engaged state of the fixed nut 36 utilizing a positive pressure. The case of utilizing a positive pressure is the same as the case of FIG. 7A of utilizing a negative pressure, except that the blowing step S20 is absent, and, therefore, a redundant description is omitted. In a case of utilizing a positive pressure, after the mounting step S10, the first solenoid valve 42 is put into a closed state, whereas the second solenoid valve 46 is put into an open state, for a predetermined time, and a positive pressure is made to act on the first flow path 30b and the second flow path 40, whereby the screw-engaged state determining section 54 determines the acceptability of the screw-engaged state (determining step S30).

While an example in which the screw-engaged state determining section 54 determines the screw-engaged state of the fixed nut 36 has been described in the aforementioned embodiment, the screw-engaged state determining section 54 can also determine an inserted state of the cutting blade 34 inserted in the second boss section 30d. Specifically, after the second boss section 30d is inserted into the central hole 34b of the cutting blade 34, and before the fixed nut 36 is screw-engaged with the second boss section 30d, the inserted state of the cutting blade 34 is determined by utilizing a negative pressure.

For example, in a case where the cutting blade 34 is inserted in the second boss section 30d in an obliquely inclined state, when a negative pressure is made to act on the first flow path 30b or the like, the pressure value and the flow rate value become abnormal values higher than the thresholds, due to the gap between the one surface $34a_1$ and the flange section 30f. In this case, the screw-engaged state determining section 54 determines that insertion is defective, and urges re-insertion of the cutting blade 34 through the informing section 56. It is to be noted, however, that, in a case of determining the inserted state of the cutting blade 34 by utilizing a negative pressure, when the blowing step S20 is conducted, the cutting blade 34 may be detached from the second boss section 30d, and, therefore, the blowing step S20 described referring to FIG. 7A is not performed.

In this way, by the screw-engaged state determining section 54 determining the inserted state of the cutting blade 34, it is possible to prevent irrational fixation of the cutting blade 34 inserted obliquely into the second boss section 30d by the fixed nut 36. Therefore, damage to the second boss section 30d can be prevented. Other than the above-mentioned, the structures, methods and the like according to the above embodiment can be modified, as required, insofar as the modifications do not depart from the scope of the object of the present invention.

For example, an annular cutting edge (namely, a hubless-type cutting blade 34) may be clamped between a presser nut (not illustrated) and the flange section 30f, in place of the hub-type cutting blade 34. However, it is to be noted that, also in this case, the fixed nut 36 is disposed on the opposite side of the presser nut from the cutting blade 34. In other words, the fixed nut 36 is screw-engaged with the second boss section 30d, similarly to the case of the cutting blade 34, and, therefore, it is preferable to determine the screw-engaged state of the fixed nut 36.

In addition, the screw-engaged state determining section 54 may determine the inserted state of the hubless-type cutting blade 34 inserted into the second boss section 30d, before screw engagement of the fixed nut 36. Particularly, the hubless-type cutting blade 34 is small in region of contact with the second boss section 30d, as compared to the huh-type one, so that it is liable to drop from the second boss section 30d. In addition, since the hubless-type cutting blade 34 is light in weight, as compared to the hub-type one, even if it should drop, there arises little sound or vibration. Therefore, it is difficult for the operator to notice the dropping of the cutting blade 34. However, according to the aforementioned determining technique, the inserted state of the hubless-type cutting blade 34 can be automatically determined by the screw-engaged state determining section 54. As a result, screw engagement of the fixed nut 36 with the second boss section 30d, in a state in which the cutting blade 34 is not inserted into the second boss section 30d, can be prevented.

Incidentally, the control unit 52 may be connected, on a wired basis or wireless basis, to a server (not illustrated) disposed in the exterior of the cutting apparatus 2, and, each time of determination, it may transmit the determination result to the external server. When the determination result is recorded in the external server, the determination result can be utilized at the time of analysis of defect which is to be conducted later.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A cutting apparatus comprising:
   a cutting unit that has a spindle with an annular cutting blade mounted to a tip part of the spindle via a blade mount; and
   a determining unit that determines a state of the cutting blade on the blade mount, wherein
   the blade mount includes
      a mounter fixed to the tip part of the spindle, and
      a fixed nut that presses the cutting blade against the mounter to clamp the cutting blade together with the mounter,
   the mounter has
      a boss section that is inserted into a central hole of the cutting blade and has a male screw for screw engagement with the fixed nut,
      an annular flange section that is located on a base portion of the boss section, protrudes outside relative to the boss section in a radial direction of the boss section, and is able to make contact with the cutting blade in a state in which the boss section is inserted into the cutting blade, and
      a first flow path that is formed in the mounter and is connected to an opening, which opening is located outside the boss section and inside the flange section, and
   the determining unit has
      a second flow path that is connected to the first flow path, for causing a negative pressure or a positive pressure to act on the first flow path,
      a measuring device that obtains a measured value of at least one of: a pressure in the second flow path, and a flow rate of a fluid flowing through the second flow path,
      a screw-engaged state determining section that determines that a screw-engaged state of the fixed nut with the boss section is defective in a case where the measured value when the negative pressure or the positive pressure acts on the first flow path in a state in which the fixed nut is at least partly screw-engaged with the boss section of the mounter where the cutting blade is disposed indicates an abnormal value, and
      an informing section that informs a determination result of the screw-engaged state determining section.

2. The cutting apparatus according to claim 1, further comprising:
   a blade replacement unit,
   wherein the blade replacement unit has
      a blade holding section that detachably holds the cutting blade,
      a fixed nut holding section that rotatably holds the fixed nut, and
      a moving section that moves the blade holding section and the fixed nut holding section.

* * * * *